United States Patent [19]
Anderson et al.

[11] Patent Number: 6,144,959
[45] Date of Patent: *Nov. 7, 2000

[54] SYSTEM AND METHOD FOR MANAGING USER ACCOUNTS IN A COMMUNICATION NETWORK

[75] Inventors: Brady Anderson, Alpine; Calvin Gaisford, Provo, both of Utah

[73] Assignee: Novell, Inc., Provo, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,703

[22] Filed: Aug. 18, 1997

[51] Int. Cl.$^7$ .................................................. G06F 17/30
[52] U.S. Cl. ............................... 707/9; 707/10; 709/203; 709/205; 709/224
[58] Field of Search ................................. 707/8, 10, 100, 707/103, 104, 200, 201, 202, 203, 204, 9; 395/182.01, 187.01; 380/21, 25; 379/220; 345/356; 709/203, 205, 224; 370/352

[56] References Cited

U.S. PATENT DOCUMENTS

| | | | |
|---|---|---|---|
| 5,742,820 | 4/1998 | Perlman | 395/617 |
| 5,758,069 | 5/1998 | Olsen | 395/186 |
| 5,764,977 | 6/1998 | Oulid-Aissa | 707/10 |
| 5,781,910 | 7/1998 | Gostanian | 707/29 |
| 5,799,305 | 8/1998 | Bortvedt | 707/10 |
| 5,799,318 | 8/1998 | Cardinal | 707/104 |
| 5,812,780 | 9/1998 | Chen et al. | 709/224 |
| 5,819,272 | 10/1998 | Benson | 707/8 |
| 5,826,085 | 10/1998 | Bennett et al. | 709/224 |
| 5,832,486 | 11/1998 | Itoh | 707/10 |
| 5,862,325 | 1/1999 | Reed | 395/200.31 |

OTHER PUBLICATIONS

IEEE Publication, "Static and dynamic mapping of media assets on a network of distributed multimedia information servers" by Reinhard Lueling, Dept. of Mathematics and Computer Scients, University of Paderborn, GE, pp. 253–260, Jun. 1999.

*Primary Examiner*—Thomas G. Black
*Assistant Examiner*—Diane D. Mizrahi
*Attorney, Agent, or Firm*—Wolf, Greenfield & Sacks, P.C.

[57] ABSTRACT

A system and method for managing user accounts in a distributed network that provides authentication to a client user account is provided. The system authenticates a user to a directory services database having a set of credential information, and a number of workstation objects and creates a user account on the client according to configuration information associated with one of the workstation objects. Depending on the configuration information, the system will create the user account with the same set of credential information as a user account in the directory services database, or, create the user account with credentials having an alternate username and random password. The system is operable to store client workstation configuration information, and to associate other networking objects in the directory services database with the workstation object.

15 Claims, 13 Drawing Sheets

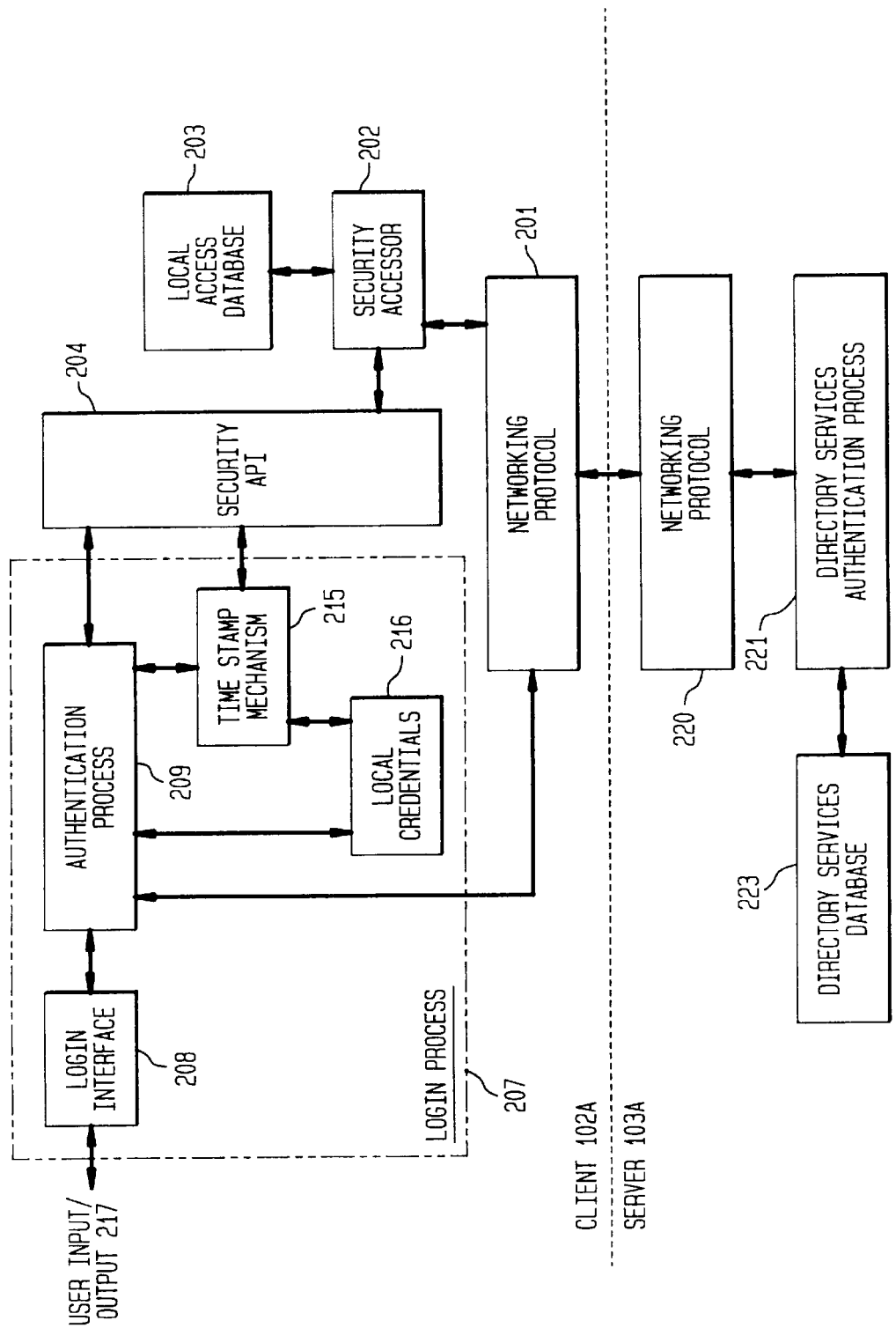

DYNAMIC LOGIN PROCESS 510

SERVER CREDENTIALS PROCESS 608

NON-DYNAMIC LOGIN PROCESS 512

LOGOUT PROCESS 1100

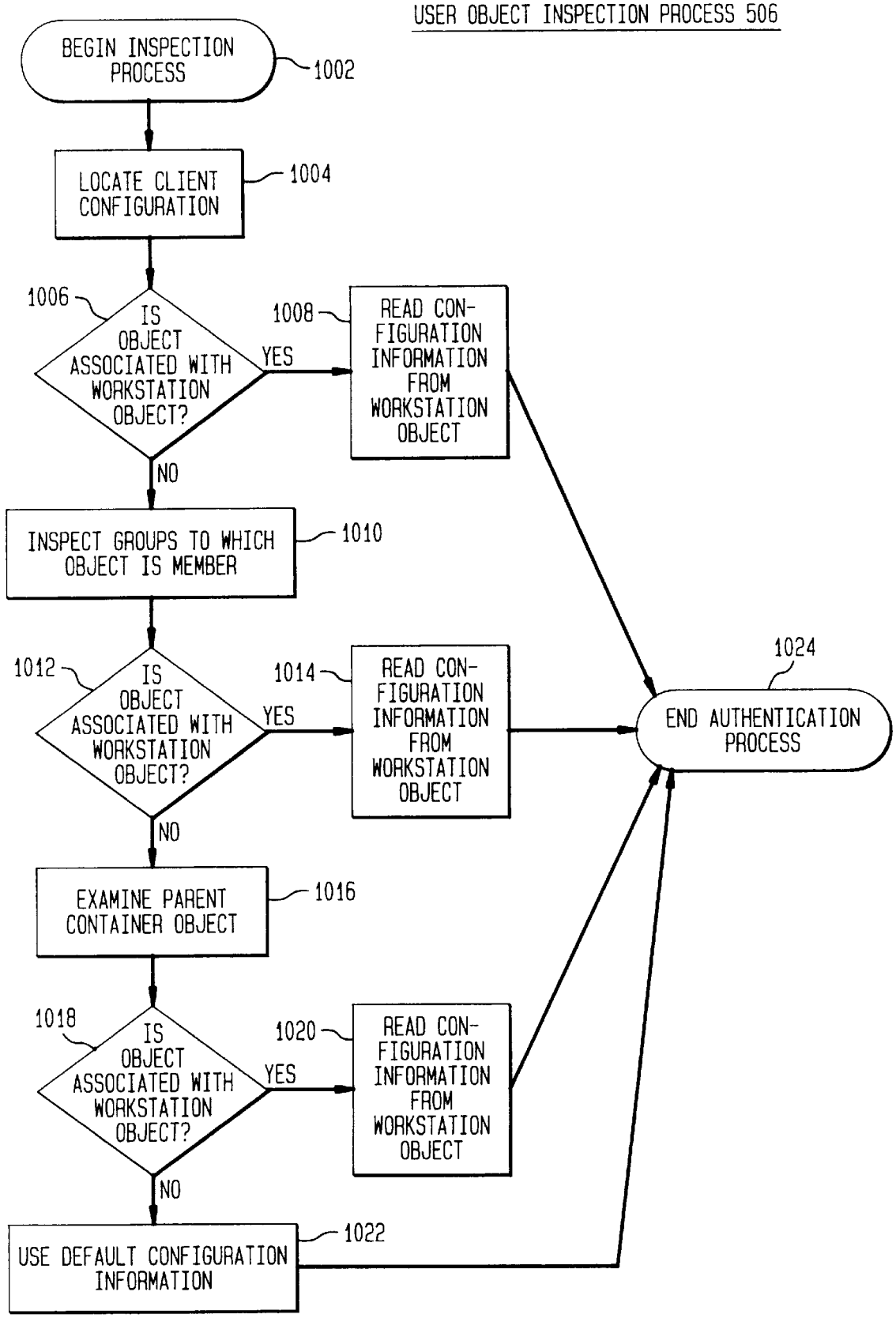

SYSTEM AND METHOD FOR MANAGING USER ACCOUNTS IN A COMMUNICATION NETWORK

BACKGROUND OF THE INVENTION

1. Field of the Invention

The present invention relates generally to client-server computer systems and, more particularly, to managing user accounts in a communication network.

2. Related Art

Computer systems commonly communicate through a communication network for the purpose of sharing information. These computer systems are typically general purpose computer systems that may function as either a "client", a "server", or both. A server computer system provides resources to client computers such as print, file, and fax services or the like. A client computer system is a system that uses such resources. An example of a client system is the Windows NT workstation client system available from the Microsoft Corporation and hereinafter referred to as a Windows NT client. Of the many available server systems, examples include the Novell NetWare and Windows NT server systems, available from Novell Incorporated and the Microsoft Corporation, respectively. These server systems will be referred to below as NetWare servers and Windows NT servers.

The server and client communicate via messages conforming to a communication protocol sent over the computer network. The server responds to request messages generated by clients, processes the request messages, and generates reply messages to the client. The client communicates with the server for the purposes of sharing information and accessing server resources. To access such resources, a client-server system typically performs an authentication process to determine if the client is authorized to access the resources.

An authentication process is a process of verifying the identity of a user attempting to access a system. The user can be a person, a computer system, or a process running on a computer system. The authentication process is generally initiated by a user through a user interface presented to the user on the client system, and is typically performed by a "login" process performed on the client system. The login process provides the user interface to the user and performs the authentication process. During the authentication process, the login process gathers authentication information referred to in the art as "credentials" from the user within the client user interface, and transfers the credentials to the server through the communications network using the communications protocol. The server then compares credential information provided by the client to credentials located on the server, which may be a file or database on the server having credentials for each user. The server then allows or denies access to a user account based on a result of the comparison.

A user account is generally a service provided by a server wherein resources are provided to a user. Typically, there is a set of credentials associated with a user account. When proper credentials are provided to the server, that is, when the credentials provided by the user matches a set of credentials on the server, the user may be permitted to access a user account associated with the entered credentials. When the user obtains access, the user is referred to as being "logged on." When the user is logged on, the user may access one or more server resources based upon an access control list. An access control list (ACL) associated with a resource contains information that is used to determine the level of access with which a particular user may access a resource.

Credentials may include such types of information such as a "username" and "password". The username is a name used to identify the user and may have an associated password that is known by the user. The username and password are typically entered by a user within fields of the client user interface. The username and password are usually encrypted and then forwarded to the server which may then permit or deny access according to the entered username and password. Credentials may include additional information, depending on the type of server system being accessed. Such additional information may include login information for a database, a login script, or other information as permitted by the server. Other types of credential information used to identify a user are well-known in the art, including retinal scan and fingerprint information.

Client systems may also require local credentials to access the local client system resources, such as a local "shell" and associated programs. Local credentials are credentials used for verification of the user to a local authentication process. The local authentication process authenticates a user and provides access to local resources. Thus, a client may also have user accounts defined locally to the client, the accounts typically being created manually by a network administrator.

A shell is a piece of software, usually a separate program, that provides communication between the user and the operating system. For example, the Windows Program Manager program in the Windows operating system is a shell program that interacts with the MS-DOS operating system available from the Microsoft Corporation. A client system that requires local credentials includes the Windows NT operating system available from the Microsoft Corporation. To access the Windows NT shell, referred to as the "desktop shell," a user may need to provide a username and password to a user interface of a client login program. The user is authenticated by the Windows NT operating system which then provides the user access to the desktop shell. On a Windows NT client, the login process is performed by a login program having several components including a Winlogon program and a Microsoft Graphical Identification and Authentication (MSGINA) program. The Winlogon program, when executed, provides a process for authenticating and logging on the user. The MSGINA program is executed by the Winlogon program and is a replaceable component of the login program. The Winlogon program provides core functions such as authentication-policy independent functions and non-user interface functions. The MSGINA program provides authentication policy and identification and authentication user interaction functions.

To access a server system from such a client system, an additional authentication must be performed between the client and server systems. The credentials may be different between the client and server systems for a user, and thus the user may be required to provide a different set of credentials for each server system that is accessed. Administering accounts for both local and server systems may be unwieldily for a network administrator responsible for maintaining accounts on the network. To alleviate the problem of performing both a client and server authentication on a Windows NT client and Windows NT server, a centralized system for account management referred to as Microsoft Domains was developed.

The Microsoft Domains account management system allows the network administrator to define one or more domains used by an administrator to centrally manage Windows NT client accounts. A domain is a defined group of resources such as client workstations, printers, and the like, used to organize and maintain network resources. Administration of domains is typically performed by a network administrator with the assistance of an application program known as User Manager for Domains available from the Microsoft Corporation. There may be different types of domains, generally based upon the number of users and the level of security desired between domains. Administration of domains may be complex for large networks having a large number of user accounts since the Microsoft Domains system provides a flat hierarchical view of user accounts and does not adequately handle a large number of users. Administration of domains may be unfamiliar to network administrators trained only in NetWare network administration since the domain hierarchy has a different structure than a NetWare network hierarchy which is a has tree hierarchy.

A user may desire access to a NetWare server from a Windows NT client workstation. In many existing networks, the NetWare server operating system is a prevalent server type while Windows NT is currently a popular operating system for clients. It would be beneficial for Windows NT clients to freely share information and access NetWare server resources. However, for networks with both NetWare and Windows NT servers, the Microsoft Domains system does not provide authentication services for NetWare servers.

It also may be desired to incorporate Novell Directory Services (NDS) database functionality into the Windows NT operating system environment, since the NDS database provides a centralized source of network resource information and authentication process. The NetWare NDS database, through the use of the Microsoft Windows NT Explorer program, provides users and administrators with a view of NetWare network resources. This view simplifies network use as well as network administration and management. In addition, the NDS database, when used in conjunction with an administrative program such as the NetWare Administrator, allows centralized network management and administration and automation of many administrative tasks.

User account and credential information is stored within the NDS database for all users of a Novell network. The NDS database stores a number of objects, such as user objects, server objects, printer objects, and the like. The NDS database has an associated authentication process for authenticating users of the NDS database objects. When a user authenticates with the NDS authentication process, the user is provided access to multiple objects defined in the NDS database depending on an ACL associated with each object. Thus, a user may be authenticated once by the NDS authentication process to allow the user access to multiple systems on a Novell network, since the NDS authentication process authenticates the user to multiple objects transparently.

Problems in a client-server network using Windows NT as a client operating system with a Novell NetWare server include having to maintain credential information on both the client workstation and the server. Maintenance of multiple sets of credential information requires significant administrator labor in networks having many client workstations, since an administrator must travel to client workstation locations to maintain client workstation accounts. Also, manually synchronizing credential information frequently results in errors on behalf of the network administrator.

Furthermore, administrators must be trained to administer different authentication systems since users and groups are managed from separate administration programs. Specifically, in a NetWare operating system-based network (hereinafter referred to as a Novell network), it may not be preferred to implement the Microsoft Domains account management system since network administrators would require additional training for managing Microsoft Domains through the User Manager for Domains program. In addition, an administrator must be knowledgeable of the NetWare-based account management program, the NetWare Administrator program available from Novell Incorporated.

What is needed, therefore, is a system for maintaining credential information between client and server accounts and for managing user accounts from a central location that can provide authentication to different types of server systems, such as Novell NetWare and Windows NT.

SUMMARY OF THE INVENTION

The invention includes a system for authenticating a user to multiple systems. In addition, the system authenticates to a client workstation in a manner transparent to the user, and generates a user account on the client workstation if the user account does not exist. Further, the system provides a workstation object to a directory services database, permitting a network administrator to efficiently manage client workstation accounts through an existing management program. Also, since the existing management program and directory services database are modified to manage client workstations, a network administrator does not have to visit each client to setup user accounts. Since user account information is maintained in the directory services database, the system allows a user to roam to different workstations and access the same user accounts and workstation properties.

The invention further provides a system using a single set of credentials for accessing a plurality of servers that are centrally located and managed. Thus, simplification of administration is attained since an administrator does not have to maintain separate accounts on a shared workstation for all potential users. Administration is further simplified by eliminating need to manage users separately in a directory services database and a domain database. Advantageously, the client is allowed to access network resources defined in the directory services database.

In another aspect of the invention, a method is provided for managing user accounts in a network having a client and server, the method comprising the steps of logging in a user to a first server having a database, the database having a first set of credential information, accessing a workstation having associated configuration information, based on the configuration information, generating a user account on the client, and logging the user in to the client account using the first set of credential information. In another aspect, the generating step includes the steps of starting a timer when the client account is generated and deleting the client account when the timer exceeds a predetermined time. Significantly, accumulation of excess user accounts on the client is prevented.

In another aspect of the invention, a system is provided for authenticating a user to a client workstation having a security accessor, the system comprising a login process being operable to create a user account on the client workstation and a directory services authenticator providing credentials to the login process, wherein the login process authenticates a user to the security accessor using the credentials.

In another aspect of the invention, a client-server system is provided for managing user accounts in a communication network, the system comprising a directory services database having a plurality of network objects, and a client administrator associated with the directory services database, configured to create a plurality of client objects in the directory services database. In another aspect, the client-server system further includes means for associating one of the plurality of client objects to at least one of the plurality of network objects. Advantageously, objects in the directory services database may be associated with workstations and their configurations.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIGS. 2A–C are block diagrams depicting an exemplary client-server system incorporating an embodiment of the present invention;

FIG. 10 is a flowchart exemplifying the operation of a user object inspection process.

DETAILED DESCRIPTION

The present invention will be more completely understood through the following detailed description which should be read in conjunction with the attached drawings in which similar reference numbers indicate similar structures. All references cited herein are hereby expressly incorporated by reference.

Figure 1:
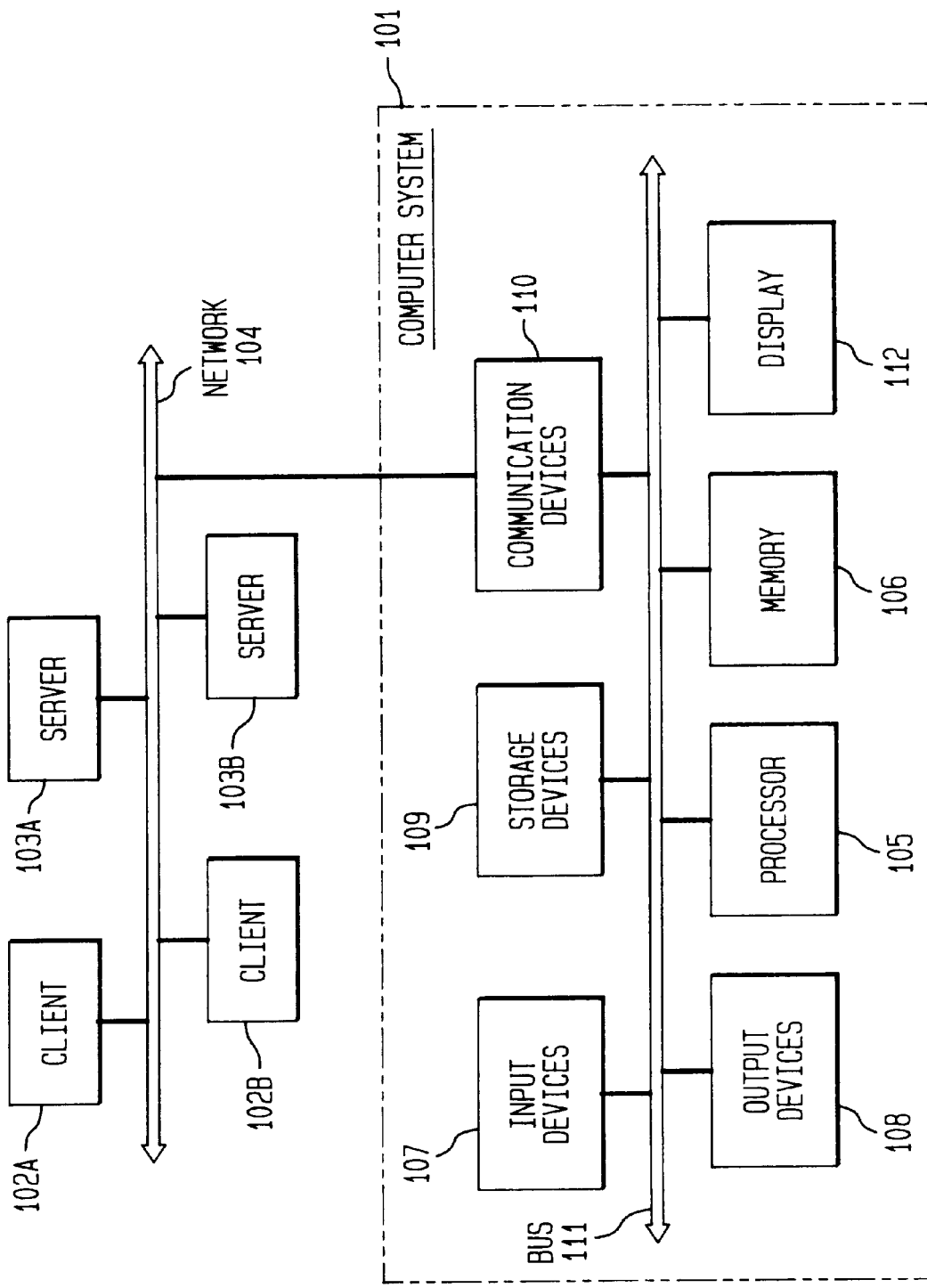
FIG. 1 is a block diagram of an exemplary computer system suitable for incorporating an embodiment of the present invention.

An example computer system which may be used to practice the present invention is depicted in FIG. 1. The computer system 101 includes a processor 105 connected to one or more storage devices 109, such as a disk drive. The computer system also includes one or more output devices 108, such as a monitor or graphic display 112, or printing device (not shown). The computer system 101 typically includes a memory 106 for storing programs and data during operation of the computer system 101. In addition, the computer system may contain one or more communication devices 110 that connect the computer system to a communication network 104.

Computer system 101 may be a general purpose computer system that is programmable using a high level computer programming language. The computer system may also be implemented using specially programmed, special purpose hardware. In the computer system 101, the processor 105 is typically a commercially available processor, such as the PENTIUM microprocessor from the Intel Corporation, PowerPC microprocessor, SPARC processor available from Sun Microsystems, or 68000 series microprocessor available from Motorola. Many other processors are available. Such a processor usually executes an operating system which may be, for example, the DOS, WINDOWS 95, WINDOWS NT available from the Microsoft Corporation, MAC OS SYSTEM 7 available from Apple Computer, SOLARIS available from Sun microsystems, NetWare available from Novell Incorporated, or UNIX available from various sources.

The communication network 104 may be an ETHERNET network or other type of local or wide area network (LAN or WAN), a point-to-point network provided by telephone services, or other type of communication network. As discussed above, information consumers and providers, referred to as client 103 and server 102 systems, respectively, communicate through the network 104 to exchange information. Computer system 101 may be configured to perform as a client 102 or server 103 system or both on the network 104. A server 103A and 103B may offer a number of resources to clients 102. The server typically provides access to these resources in response to a request generated by a client 102A through the network 111.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

The present invention may be programed using an object-oriented programming language, such as Smalltalk, JAVA, or C++. In object-oriented programming, code and data that are related may be combined into objects. An object is an instance of an entity that embodies both specific data and the functions that manipulate it. In object-oriented programming, an object is an entity that has state, behavior and identity. Objects are created, or instantiated, during the execution of an object-oriented program wherein instances of objects are created. Objects may be related, as in a parent-child relationship, wherein features such as methods and/or data structures are inherited by a child object from a parent object. Objects are typically created in class hierarchies, and the methods and/or data structures of objects are inherited through the hierarchy. Other such relationships exist between objects. It should be understood that the present invention may be implemented in any object-oriented programming language suitable for authenticating clients with servers. In addition, the invention may be implemented using functional programming.

Figure 2A:
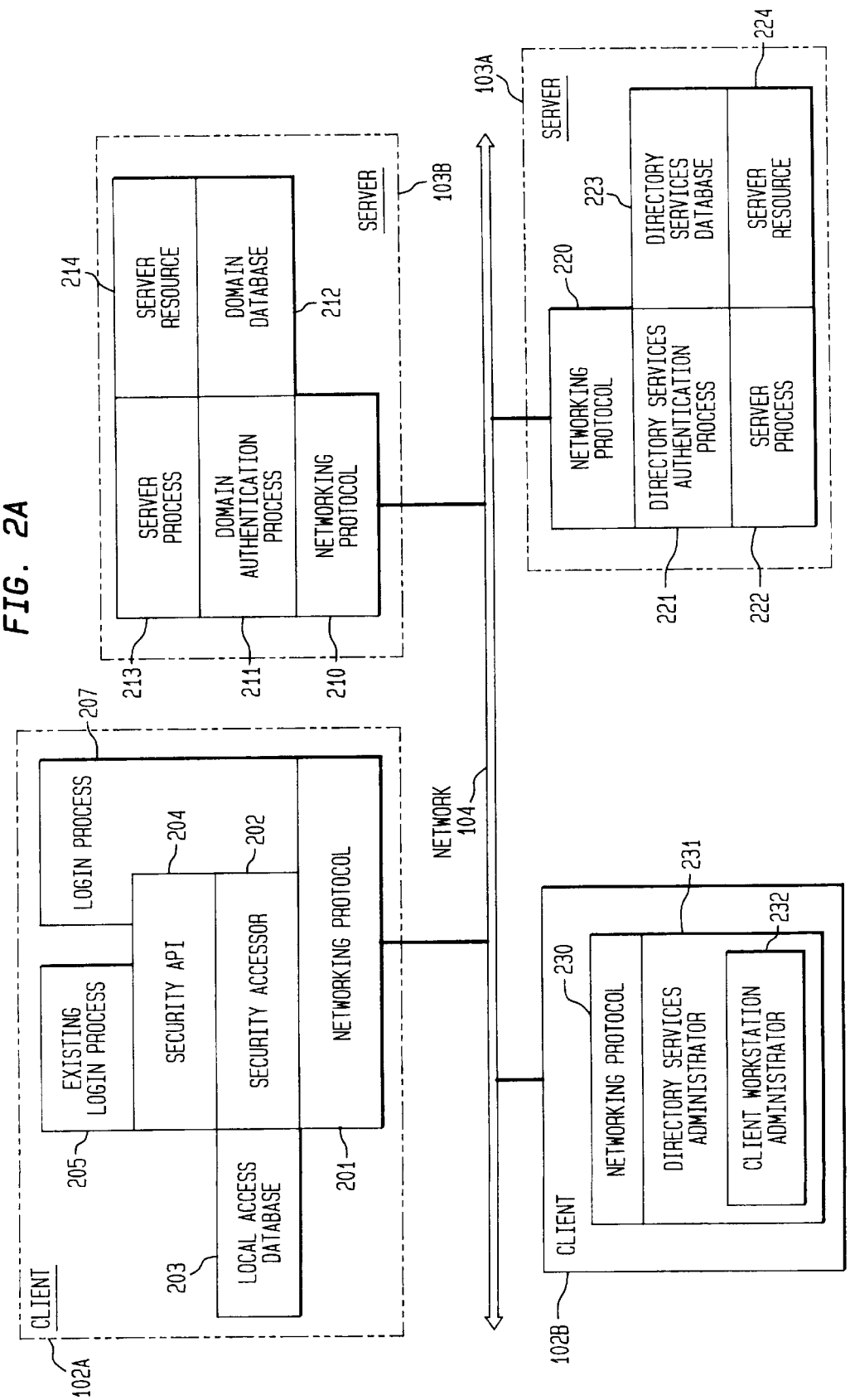

A more detailed block diagram of a client-server system implementing one embodiment of the present invention is shown in FIG. 2A. A client 102A implementing the present invention typically includes a networking protocol 201 used by an application program to communicate with servers 103. Examples of a networking protocol 201 includes a TCP/IP networking protocol used to communicate over the Internet and other computer networks, and the IPX/SPX networking protocols available from the Novell Corporation. Other networking protocols may be used.

In addition, the client 102A includes a security accessor 202 which provides access on the local client 102A. Client 102A may be, for example, a Windows NT client and the security accessor 202 may be the well-known security accounts manager (SAM). Specifically, SAM is a process executed on a Windows NT client that monitors requests for access to the local workstation. Local access requests may be generated by an existing login process 205 by making function calls defined within a security Application Program Interface (API) 204 described in more detail below. The security accessor 202 accepts credential information provided by functions in the security API 204 and compares the credential information to a local access database 203. If, the credential information matches a record in the local access database 203, the security accessor 202 allows the user to access client 102A.

As shown in FIG. 2A, there is a server 103B with which the client 102A commonly communicates. Server 103B may be, for example, a Windows NT server. Server 103B includes a networking protocol 210 that is compatible with networking protocol 201. On a Windows NT server, this networking protocol may be TCP/IP. Other networking protocol types are available. Also on server 103B, is a domain authentication process 211 that provides authentication to a domain defined on the server. The domain and its users are defined within a domain database 212. The domain database may be, for example, a database having a flat structure such as the Microsoft Domains database. The domain authentication process 211 compares credentials contained in a request for access generated by the client 102A to entries within the domain database 212. If the credentials provided by the client 102A match a credential record in database 212, the domain authentication process 211 allows access to the server process 213 and associated server resources 214. The level of access provided to the client 102A to the server resource 214 depends upon access information stored within the domain database 212.

As discussed above, the existing login process 205 provides access to a server resource 214 located on server 103B. Access is provided by the security accessor 202 through calls made to the security API 204. Generally, an API is a collection of programs which may be used by a program to perform functions on a system. On a Windows NT client, this API 204 is the Win32 API used to manage access to domains in the local access database 203. The Win32 API is available for use by program developers to develop programs requiring access to Microsoft domains and Windows NT workstation account information. A program which accesses functions provided by the Win32 API will be referred to hereinafter as a "calling program," that is, a program that executes another program.

The Win32 API includes a number of functions for performing operations with credential information. The Win32 API includes the NetUserAdd function used to create a new user on a local Windows NT workstation. The NetUserAdd function accepts a number of parameters. A first parameter specifies in which domain a user account is created. When the value of the parameter supplied by a program is null, the NetUserAdd function creates a user on the local workstation within the local access database 203. Another parameter includes a number of sub-parameters such as username and password, wherein the username is the name of a new user to be created and the password is a password to be assigned to the new user. The login process 207 may use either a directory services user name or an alternate user name specified by a workstation object described below. Process 207 may use a directory services password entered by a user in a login screen generated by the login process 207 or a randomly generated password if an alternate user name from the workstation object is used. Additional information may be specified which defines additional attributes for the new account. Such information includes an attribute that indicates that the password for the account should not expire, an attribute indicating that a default account should be created, and an attribute indicating that the password associated with the new account should not change. The NetUserAdd function, when executed, will return information to the calling program indicating that the new account was successfully created.

The NetUserGetInfo function may be used by a program to verify if a user account already exists in the local access database 203. A first parameter specifies from which domain to obtain the user account information. A null value for the first parameter is used to obtain the user account information from the local access database 203. The API function NetUserGetInfo returns success information if the user account exists in the local access database 203. The NetUserGetInfo function is also used to return information located in the local access database 203 concerning the user account. The NetUserGetInfo function returns information associated with the user account such as the full name of the user, the description of the account, and any account flags and restrictions placed on the account.

The NetUserSet Info function may be used by an application program to set a password associated with a user account. If a first parameter is set to a value of null, the NetUserSetInfo function may use an account within the local access database 203. The function also accepts a username designating the account for which the password will be changed or set. Generally, the login process 207 will use a directory services username for the local account. The NetUserSetInfo function will return information to the calling program indicating that the password associated with the account was successfully set.

The NetUserDel function may be used by an application program to delete a user account. This function may be used when deleting a volatile user account (described below) during logout or shutdown of the client 102A as described below with respect to FIG. 11. If a first parameter is set to a null value, the user account which is deleted will reside in the local access database 203. A username parameter is accepted by the NetUserDel function, the username being the local user account to delete. The login process 207 may be either the directory services user account or an alternate user account defined by the workstation object. The NetUserDel function returns information to the calling program indicating that the user account was successfully deleted.

The NetLocalGroupAddMember function may be used by an application program to add newly-created user to a user group according to group information associated with the workstation object. The first parameter specifies which domain to associate members to groups. When the first parameter has a null value, the NetLocalGroupAddMembers function associates a user to groups defined in the local access database 203. TheNetLocalGroupAddMembers function accepts a group name which is a name of the local group. The identifier/authenticator 207 obtains the group name from the workstation object described below. The NetLocalGroupAddMembers function also accepts a local domain name which is arbitrarily set to the local client name followed by the directory services user name by the login process 207. The function returns information to the calling program indicating that the user was successfully added to the group.

The NetLocalGroupDelMembers function may be used by an application program to remove a user from a group when a workstation object no longer associates the user to the group. The NetLocalGroupDelMembers function accepts a first parameter specifying which domain to remove users from groups. When the first parameter has a value of null, the NetLocalGroupDelMembers function removes users from groups defined in the local access database 203. The function also accepts another parameter whose value is the name of the local group. The login process 207 obtains this group name from the workstation object. As in the NetLocalGroupAddMembers function, the NetLocalGroupDelMembers function accepts another parameter whose value is the domain name which is arbitrarily set to the local computer name followed by the directory services user name. The function returns information to the calling program indicating that the user was successfully removed from the group.

The NetUserGetLocalGroups function may be used by an application program to determine what local groups a local user belongs to. The NetUserGetLocalGroups function accepts a first parameter which specifies the domain wherein the user account is located. When the first parameter assumes a null value, the NetUserGetLocalGroups function obtains group information from the local access database 203. The NetUserGetLocalGroups function accepts a user name parameter which is the name of the local user account for which the calling program wishes to obtain the associated group list. The function returns the groups associated with the user account, and, if successful, returns the group information to the calling program.

FIG. 2A shows a server 103A having a number of server resources 224. A user desires access to such resources 224. Server 103A also includes a networking protocol 220, which is compatible with networking protocol 201. Also, server 103A includes a directory services authenticator 221 used for authenticating users to the server 103A. The directory services authenticator 221 accepts credential information transmitted by the client 102A through the network 104 and compares this credential information with a directory services database 223. If, in the directory services database 223, there exists a credential record matching the credential information provided by the client 102A, the user is provided access to the server process 222 and any server resource 224 associated with the user account. The credentials provided by a user to server 103A are referred to as directory services credentials. The server 103A may be, for example, a NetWare server having a NDS database 223. The server process 222 would be, in this case, a NetWare server process and its associated resource would be a NetWare resource.

Significantly, an embodiment of the present invention provides several components. The first component is the login process 207 that collects credential information from the user and performs authentication to servers 103A and 103B. On a Windows NT client, the login process 207 is executed wherein the process 207 has administrative privileges. By having administrator-level privileges, the login process 207 may dynamically create and delete Windows NT client user accounts. Administrator level privileges are typically provided when a user is logged into an administrator account. The administrator account generally has access to all resources, that is, the administrator account is listed as having access in ACLs of the resources. An embodiment of the invention provides a second component which provides an administrator the ability to administer client accounts from the directory services database 223. This administrative ability is provided by a client workstation administrator 232 described below in reference to FIG. 2C. Thus, an administrator may administer client accounts without having to implement Windows NT servers and a Microsoft Domain database.

In an embodiment of the present invention, a login process 207 is provided and used in lieu of the existing login process 205. In the Windows NT environment, use of one program in lieu of another is facilitated by modifying a registry on the Windows NT client. A registry is a configuration database known in the art of Windows programming and used to store configuration data associated with Windows programs and the Windows NT operating system. The login process 207 is executed by modifying a reference in the registry to execute a program associated with login process 207 in lieu of the existing program associated with the 205 login process. Modifying the Windows NT registry is well-known in the art of Windows 95 and NT system programming.

Also as shown in FIG. 2A, there may be a client 102B that provides an administrator access to provide administration to the directory services database 223. The client 102B includes a networking protocol 230 that is compatible with networking protocol 220 on server 103A. The client 102B includes a directory services administrator 231 which may be an application program used to perform administrative functions on the directory services database 223. In an embodiment of the invention, a client workstation administrator 232 is provided to the directory services administrator 231 for administering client 102A workstations. The directory services administrator 231 may be, for example, the NetWare Administrator application program available from the Novell Corporation, used by a network administrator for administering an NDS database. As discussed below, the client workstation administrator 232 may be used to provide additional administrative functions related to client 102A. Such administrative functions may include setting client 102A operating system settings, editing accounts on client 102A or other similar administrative tasks.

The client workstation administrator 232 may be, for example, a dynamic link library (DLL) provided with the NetWare administrator application program. A dynamic link library allows an application program to include only the information the program requires at load time or run time to locate the code for an exported DLL function. Thus, by exporting functions to a DLL, code associated with a function may be loaded into memory of the system only when the function is required. The use of DLL functions are well known in the art of Windows programming.

FIG. 2B shows a more detailed view of an embodiment of a client server system. As shown, a user provides input/output 217 through a login interface 208 of the login process 207. The input/output includes information such as credentials supplied to the login interface 208 and output such as informational messages indicating successful or unsuccessful login attempts. The login interface 208 may supply additional user information, such as displaying text messages or bitmaps provided by an administrator.

The login process 207 also includes an authentication process 209 used to authenticate a user to the local client 102A as well as servers 103A and 103B. A subset of functionality within the authentication process 209 is provided by the existing login process 205 for accessing only the client workstation 102A and server 103B. On a Windows NT client 102A, the existing login process 205 includes an authentication process referred to as the Microsoft Graphical Identification and authentication (MSGINA) module. The MSGINA module is provided as a DLL and is well documented in the Win 32 Software Development Kit (SDK), available from the Microsoft Corporation, incorporated herein by reference. The authentication process 209 of an embodiment of the present invention may be, for example, referred to as the NetWare Graphical Identification and Authentication (NWGINA) module having the additional ability to authenticate a user with a NetWare server 103A and its associated NDS database 223.

The authentication process 209 stores credentials provided by the user in a local credentials storage location 216. The local credentials information 216 will be discussed in more detail below with respect to FIG. 3C. The login process 207 may also include a time stamp mechanism 215 used for deleting credential information on the local workstation or deleting accounts created in the local access database 203. An administrator may set a persistence parameter which represents the length of time that a user account may reside in the local access database 203. This persistence parameter value may be a predetermined time determined by an administrator. When the persistence parameter value is exceeded, that is, the user account has existed on client 102A longer than the value of the persistence parameter, the user account 203 is deleted from the local access database 203. The persistence parameter may be stored as a login parameter of a client workstation object described in further detail below with reference to FIG. 3B.

The authentication process 209 and time stamp mechanism 215 call security API functions 204 described above for accessing the local access database 203 through the security accessor 202. The authentication process 209 directly contacts server 103A using networking protocol 201 for authenticating a user to the directory services database 223. Access is provided by the directory services authentication process 221, which accepts credential information enclosed within an access request provided by client 102A. Credential information may be, as known in the art, may be transferred by a login program having authentication keys. Such a system is provided by the RSA authentication algorithm, described in detail in *Network Security, Private Communication in a Public World,* by C. Kaufman, R. Perlman, and M. Speciner, incorporated herein by reference. Security key authentication is well-known in the art of computer programing and the present invention may use any security mechanism known currently or in the future. Generally, credential information is encrypted before transmission on network 104.

Figure 2C:
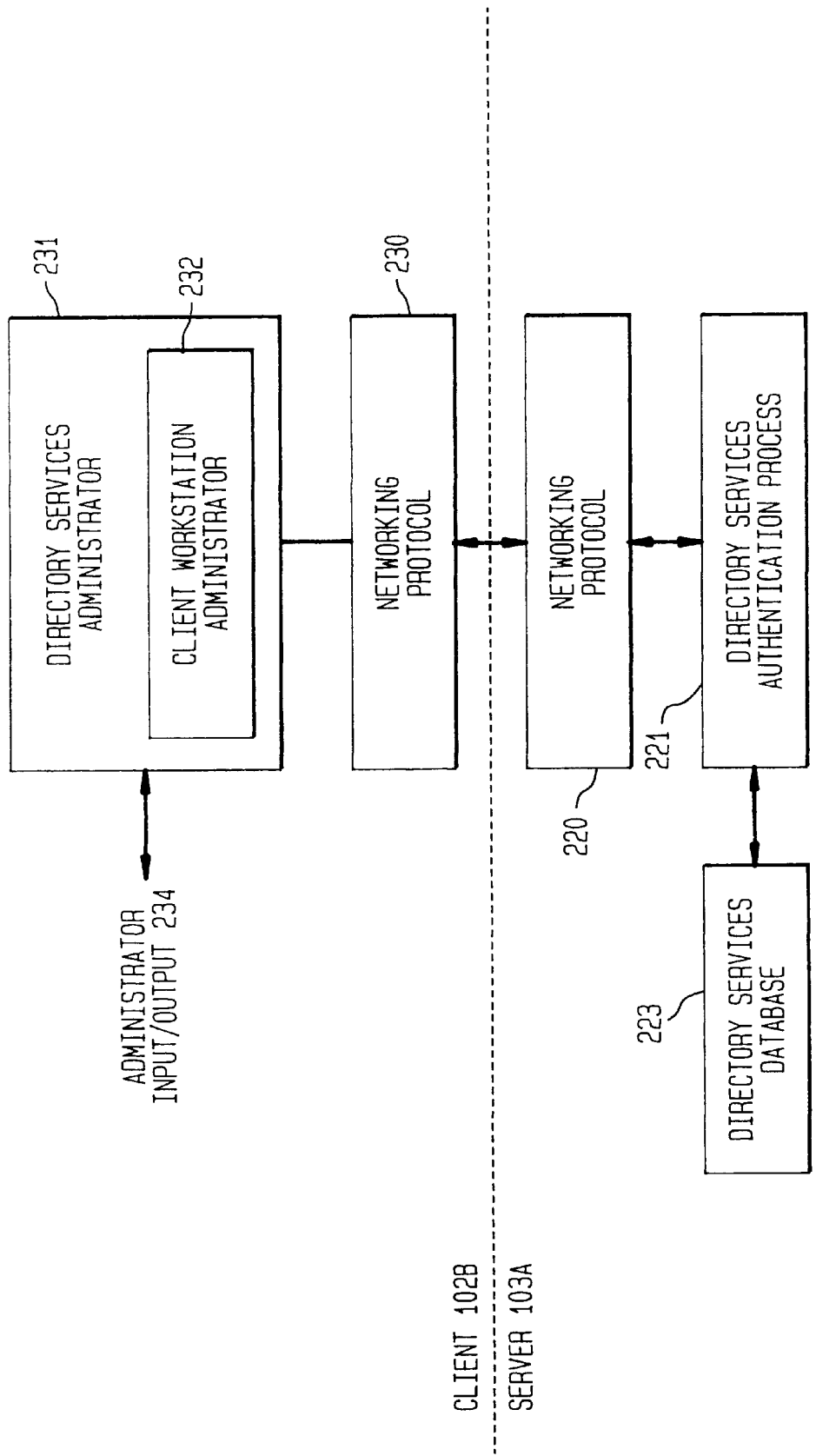

A client-server system according to one embodiment of the present invention is shown in FIG. 2C. In this embodiment, the ability to administer the directory services database 223 is provided. As shown, an administrator provides input/output 234 to the directory services administrator program 231. The directory services administrator program 231 is augmented with a client workstation administrator 232 described above. The directory services administrator 231 program utilizes networking protocol 230 to contact server 103A. The objects directory services administrator 231 generates a request through network 104, and the request is received by the networking protocol 220 located on the server 103A. The request is forwarded to the directory services authentication process 221 which, when provided the proper administrative credentials, will allow an administrator to modify the directory services database 223. An administrator may desire to add or delete user accounts located on client 102A or configure a number of workstation objects described below.

Figure 3A:
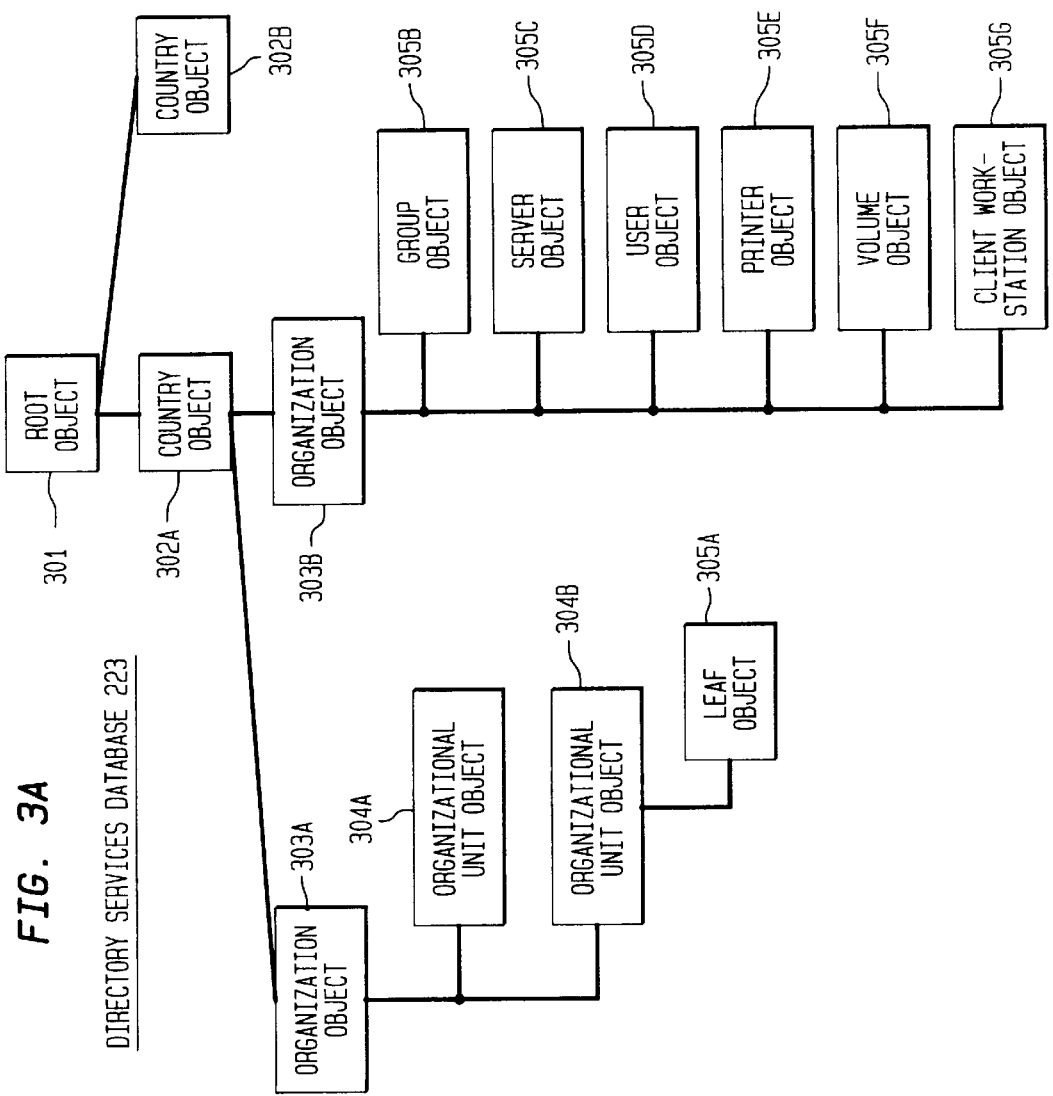
FIG. 3A is a block diagram of an exemplary directory services database.

Referring now to FIG. 3A, a more detailed view of an exemplary NDS database is shown. The NDS database 223 structure, which is well-known in the art of NetWare programming, contains two types of objects, container objects and leaf objects. Container objects, or parent objects, contain other container objects or leaf objects. Leaf objects are generally representations of networking entities such as servers, printers, users, volumes or the like. The NDS database 223 hierarchy includes a root object 301 which is a type of container object and is the top most object in what is commonly referred to as an NDS tree. The root object 301 provides an access point to different country 302 and organizational 303 objects. The country objects 302A and 302B are optional container objects that may include organizational objects 303 or alias objects (not shown) that link to other objects in the NDS tree. As shown in FIG. 3A, an organization object 303A may contain one or more container objects such as an organizational unit object 304A and 304B used to further subdivide groups of network entities.

An organization object 303B may include leaf objects 305 such as a group object 305B used to associate a number of leaf objects in a group, a server object 305C used to represent a NetWare server, a user object 305D used to represent a user, a printer object 305E which represents a printer available on the Novell network, and a volume object 305F used to represent a file volume located on a NetWare server. The directory services database 223 may be extended to support other types of container and leaf objects, such as the client workstation object 305G provided by an embodiment of the present invention. The client workstation object 305G represents a client workstation 102A such as a Windows NT workstation and its configuration.

Figure 3B:
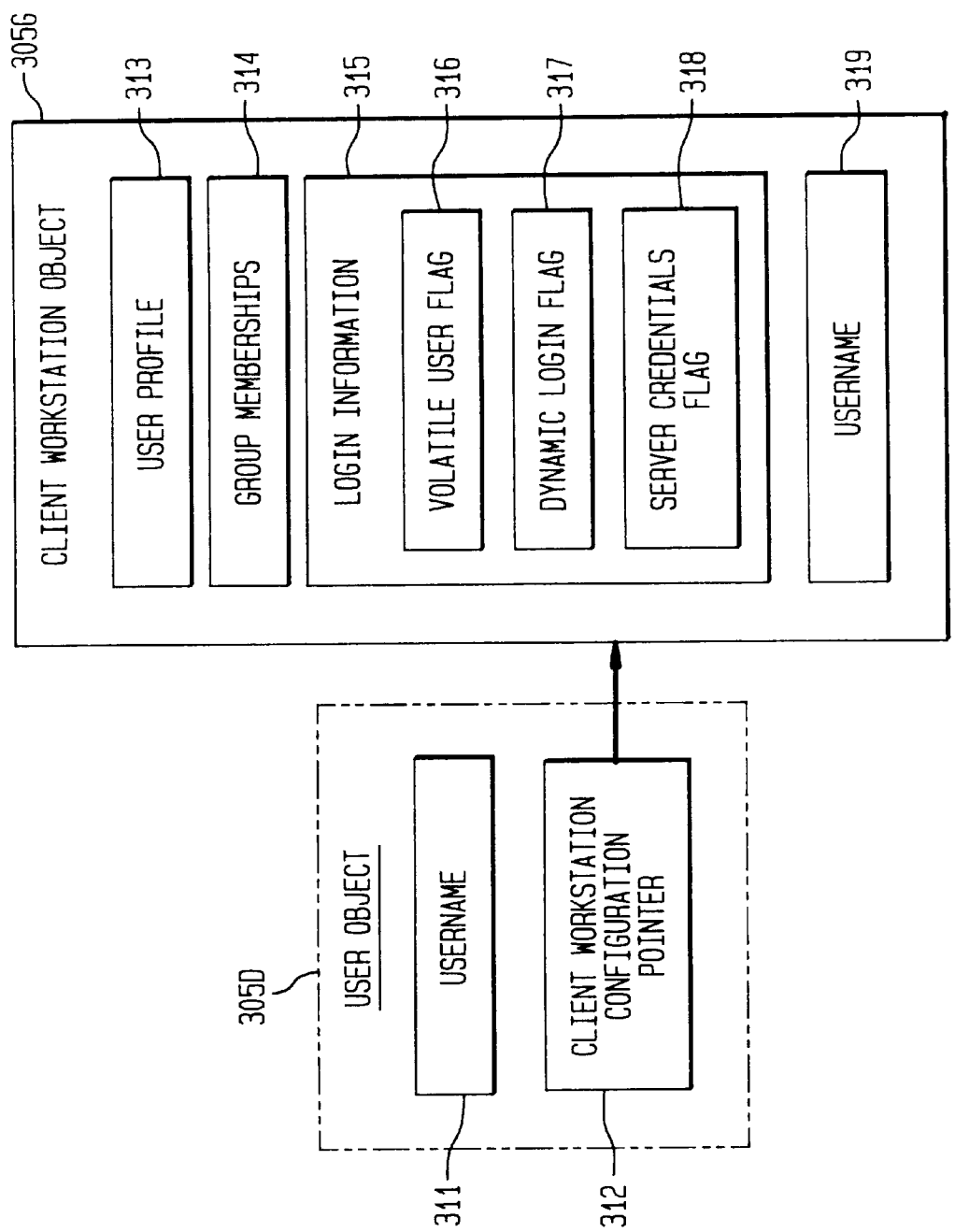
FIG. 3B is a block diagram of user and client workstation objects according to an embodiment of the present invention.

FIG. 3B shows a user object 305D and client workstation object 305G in further detail. These objects may include a number of parameters for storing information associated with users and client workstations. For example, the user object 305D may include a username parameter 311 that stores the username associated with a user account. User object 305D may be "associated" with another object, that is, one object is linked to another object. Associations may be performed between NDS objects, such as associating a number of user objects 305D to a group object 305B. The group object 305B has a member list, which is a list of pointers to objects to which the group object is associated. Another type of association is an association to a client workstation object 305G. The association is performed by a client workstation configuration pointer 312 which references a client workstation object 305G. Similar to the user object 305D, the client workstation object 305G provided by an embodiment of the present invention, may include a number of parameters.

The client workstation object 305G may include user profile parameters 313 which store information relative to settings for the desktop shell program executed on client 102A. Such settings may include parameters such as window colors, positions of icons, or other settings for the user environment provided by the desktop shell program. On a Windows NT client, the user profile 313 is referred to as Windows NT user profiles. The user profile 313 is typically a pointer to a configuration file located on a file system of server 103A. The user profile parameters 313 include settings for the Windows NT desktop shell. Since the Windows NT user profile is accessible through the NDS database, users may access their desktop profiles from various clients throughout the network.

The client workstation object 305G may include a group memberships parameter 314 which stores any group memberships associated with a client workstation. When the authentication process 209 creates an account in the local access database 203, process 207 may provide group membership to a user account. The groups to which the user is associated may be added through a user interface program used to administer the directory services database 223, such as the directory services administrator application program 231. When the login process 207 creates the client 102A account in the local access database 203, the user may be added to a users group and an administrator group. Other groups may be added through the directory services administrator program 231.

The client workstation object 305G may include login information 315 having a number of sub-parameters. Such sub-parameters may include a volatile user flag 316 used to specify whether a new account created on the client 102A should be deleted from the local access database 203 when a user logs out of the client 102A. If the account in nonvolatile, a user account is created in the local access database 203. When the user logs into the client 102A and the account remains in the local access database 203 after the user logs out of the client 102A. The new account is then available for later use, perhaps if the user logs into the client 102A at a later time.

A volatile user account does not remain within the local access database 203. When the user logs into the client 102 with a volatile user account, and the user logs out of that account, the login process 207 deletes that user account. Advantageously, deletion of accounts prevents a large number of user accounts from accumulating on the client 102A. Also, deletion of accounts also prevents users from gaining access to the client 102A without first authenticating to the server 103A, since the credentials needed to access the account are deleted from the local access database 203. The volatile user flag 216 parameter may be set through the directory services administrator 231 user interface as described above.

Login information 315 may also include a dynamic login flag 317 used to indicate whether user information should be retrieved from the client workstation object 305G to create a user account on the client 102A. When the login process 207 inspects a workstation object 305G, the login process 207 may need to identify if a user account should be created in the local access database 203. If dynamic login is not enabled, the login process 207 does not create a user in the local access database 203, but instead attempts to find an existing user account in the local access database 203, the account having credentials as supplied by a user to the login interface 208. If dynamic login is enabled, then the authentication process 209 obtains the client user name from the workstation object 305G and queries the local access database 203 to verify that the user name already exists. If the user name exists, the authentication process 209 authenticates the user to the client 102A and access is granted to the user. If the user name does not exist, then the authentication process 209 creates a user account within the local access database 203.

Login information 315 may also include a server credentials flag 318 which identifies whether the same credential set used for authentication to the directory services database 223 or a predetermined credential set specified in the workstation object 305G. When using directory services database 223 credentials to create the client user account, the authentication process 209 queries the users directory services user account for the user name, and associated information. In a preferred embodiment, the password generated for the account in the local access database 203 is the same as the directory services user account password. If server credentials are not used, then other credentials may be used, such as the credentials specified in the user name 319 parameter of the client workstation object 305G and a randomly-generated password. The user name 319 stores a default user name for use at the client 102A. The randomly-generated password associated with user name 319 may be generated by the authentication process 209 and is generally not accessible by the user.

Login information 315 may include any references to scripts or programs external to the login program to be executed upon login to the client 102A. The locations and execution settings for these scripts or programs may also be included within login information 315. Also, any messages or bitmaps to be displayed by an administrator in the login interface may be included within login information 315. As discussed above, login information 315 may also include a persistence parameter which determines when a user account will be deleted from client 102A.

A network administrator may provide access for different directory services users and, therefore, can create a number of different client workstation objects 305G. Directory services users may be associated with a client workstation object 305G using associations available in the directory services administrator program 231. Directory services users may be associated with a client workstation object 305G individually or through group and container associations. Associations between NDS objects may be added through a user interface presented to the administrator during the execution of the directory services administrator program 231. Associations between NDS objects are well-known in the art of NetWare user account administration.

Once a user object 305D has been associated with a client workstation object 305G, the login process 207 may retrieve user information from the workstation object 305G to create a user account on the client 102A.

Significantly, the client workstation object 305G allows user profiles to be accessed from multiple clients in the network 104. When a user logs in from a client other than the user's "normal" client 102A, that is, the client that the user normally logs into, the authentication process 209 loads a user profile 313 associated with the user and configures the desktop according to information contained in the user profile 313. A user having access to a centralized user profile 313 may load the same desktop configuration regardless of the client on which the user is located. Further, user profile 313 information may override a client's default parameters. An administrator may modify the user profile 313 associated with a client workstation object 305G and thus, when a user logs into a workstation associated with the client workstation object 305G, will modify the client's desktop configuration. As discussed, settings for a Windows NT client are contained in the registry. Information contained in the user profile 313 may override settings in the registry. Thus, the administrator is provided a system for automatically updating client system settings.

Figure 3C:
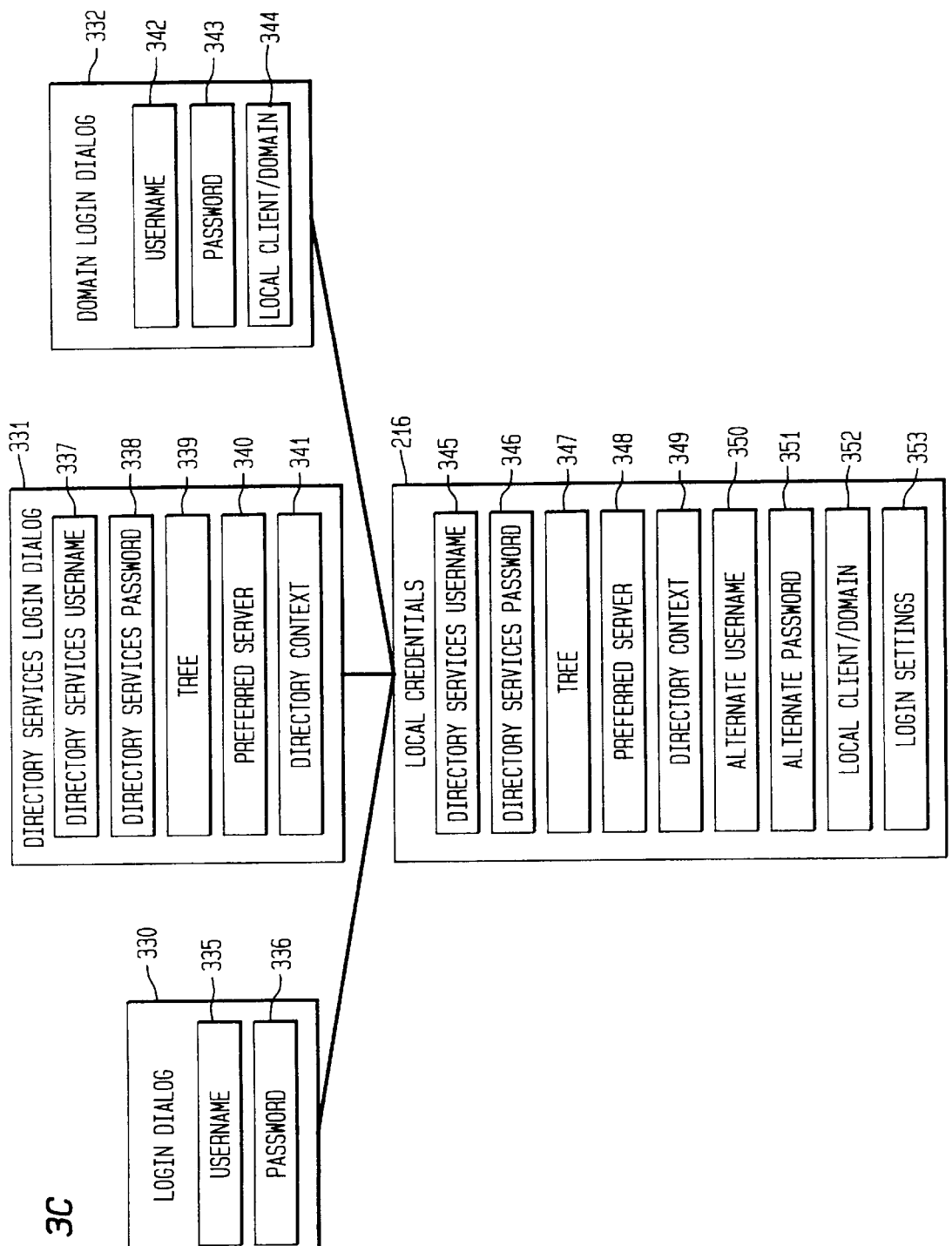
FIG. 3C is a block diagram showing credential information.

FIG. 3C shows the credentials that are required for the various systems. The login dialogue 330 typically presented to the user at the client 102A by the existing login process 207 includes a username 335 and password 356. To access server 103A, a typical server 103A login dialogue 331 prompts the user for a directory services username 337 and password 338, a directory services tree 339, a preferred server 340, and a directory context 341, the context 341 being the location in the directory services tree hierarchy to where the user will authenticate. The directory services username 347 may correspond to a username 311 of a user object 305D in the directory services database 223. A typical server 103B login dialogue 332 would present the user with an interface requesting a username 342, a password 343, and a local client/domain name 344. Local client/domain 341 may store the name of a domain or the name of a client workstation to which the authentication process 209 authenticates. As discussed above, the local credentials 216 includes credential information for systems 102A, 103A and 103B. The local credentials 216 includes storage locations for a directory services username 345 and password 346, a tree 347, a preferred server 348, a directory context 349, an alternate username 350 and password 351, and a local account or domain 352. The storage locations in the local credentials correspond to parameters required by dialogs 330–332. In a preferred embodiment of the present invention, the authentication process 209 creates a local account using the values of the directory services user name 345 and password 346, respectively. An administrator may, however, provide an alternate username 350 and password 351 to be used on the client. Importantly, the local credential information 216 is maintained separately from the local access database 203 and is modified as required by the authentication process 209 or time stamp mechanism 215. The local credentials 216 also includes login setting information 353 used to store workstation configuration information such as volatile user flags, dynamic login flag, among other information. Notably, the local credentials 216 may contain credential information sufficient to access client 102A, server 103A, and server 103B.

Figure 4:
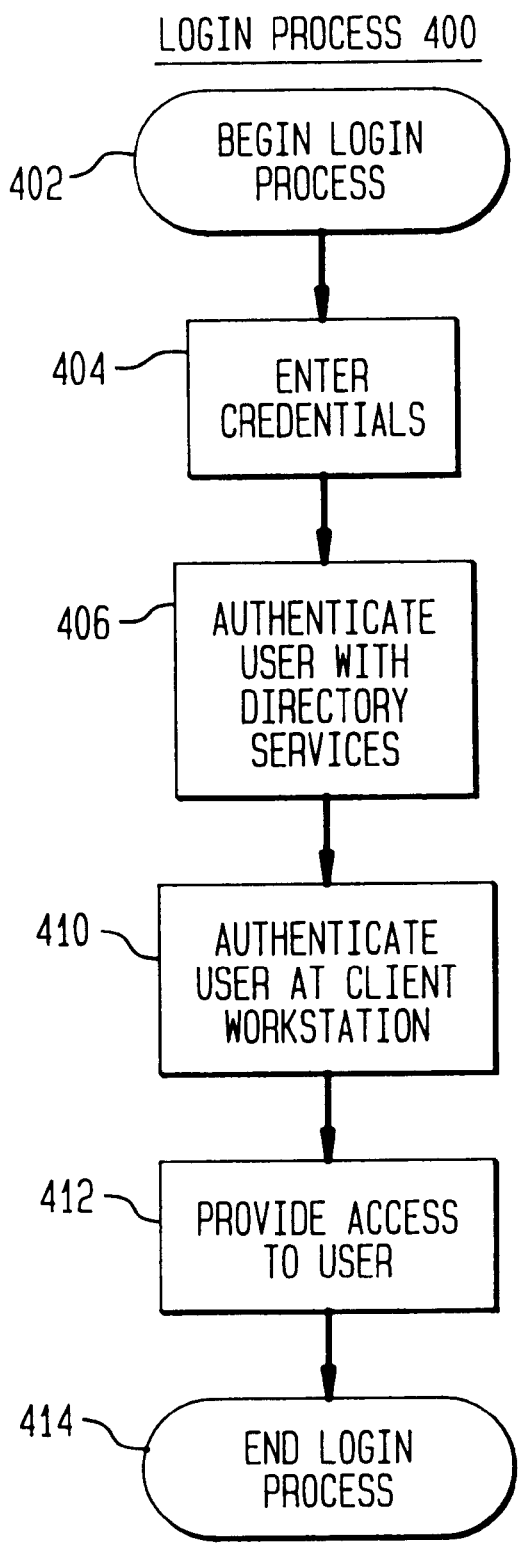
FIG. 4 is a flowchart exemplifying the operation of a login process according to an embodiment of the present invention.

A login process according to an embodiment of the present invention is shown in FIG. 4. At block 402, the login process 400 begins. At block 404, the user enters credentials within a login. The authentication process 209 stores the credential information provided by the user in the local credentials 216. At block 406, the client 102 uses the credential information provided by the user to authenticate the user with a directory services. As discussed, a user is authenticated to directory services by the directory services authenticator 221 which compares credential information provided by the user with credential records within the directory services database 223. If authenticated, process 400 then authenticates the user at the client workstation 102A at block 410. At block 412 access to the client 102A is provided to the user by the security accessor 202, that is, the login process is complete and the client conducts normal operation. If server type 103B is provided in local credentials 216, process 400 authenticates the client 102A with server 103B. Normal operation is a period of operation wherein the client has authenticated the user to services associated with the credential information. The user will be authenticated to use the user account created by the authentication process 209, described in detail below. At block 414 login process ends.

Figure 5:
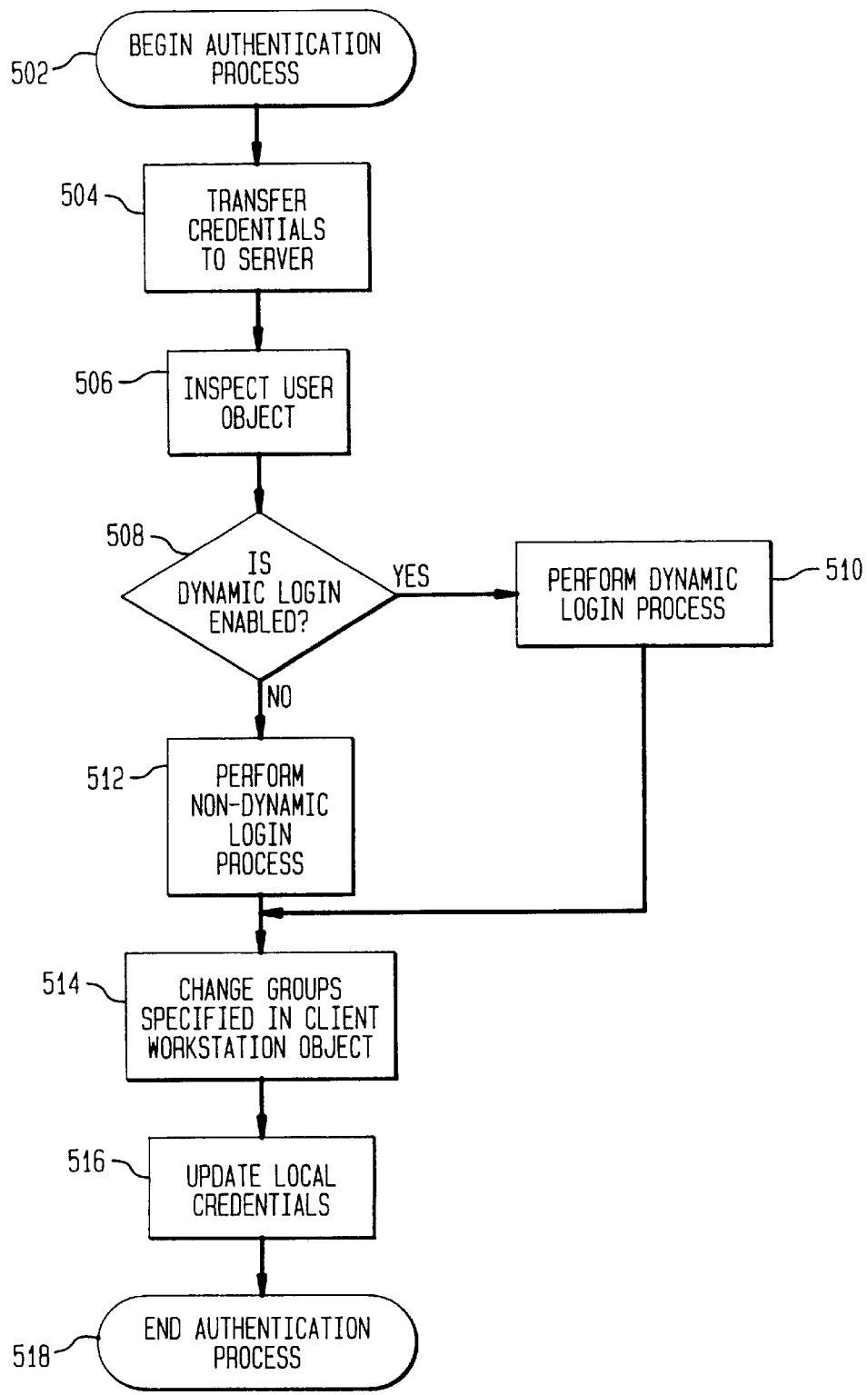
FIG. 5 is a flowchart exemplifying the operation of a process for authenticating a user with a directory service.

FIG. 5 shows, in more detail, a process for authenticating a user with directory services. At block 502 the authentication process 406 begins. The credentials provided by the user are transferred to 103A by the security accessor 202 using networking protocol 201. Networking protocol 220 at the server 103A receives the credential information and transfers the credentials to the directory services authenticator 221. The directory services authenticator 221 locates the user name within the credential information and inspects a user object 305D associated with that user name 311. If, the user object 305D is associated with a client workstation object 305G, the directory services authenticator will read the client workstation object 305G configuration associated with the user object 305D as indicated by the client workstation configuration pointer 312. If, at block 508, it is determined that dynamic login is enabled, that is, the dynamic login flag 317 is set, then the login process 207 will perform the dynamic login process at block 510. If dynamic login is not enabled, the login process 207 will perform a non-dynamic login process 512. At block 514, process 406 changes group memberships according to the group memberships 314 specified in the client workstation object 305G. At block 516, the local credentials 216 are updated according to any updated credential information created during login process 400. At block 518 the authentication process 406 ends.

Figure 6:
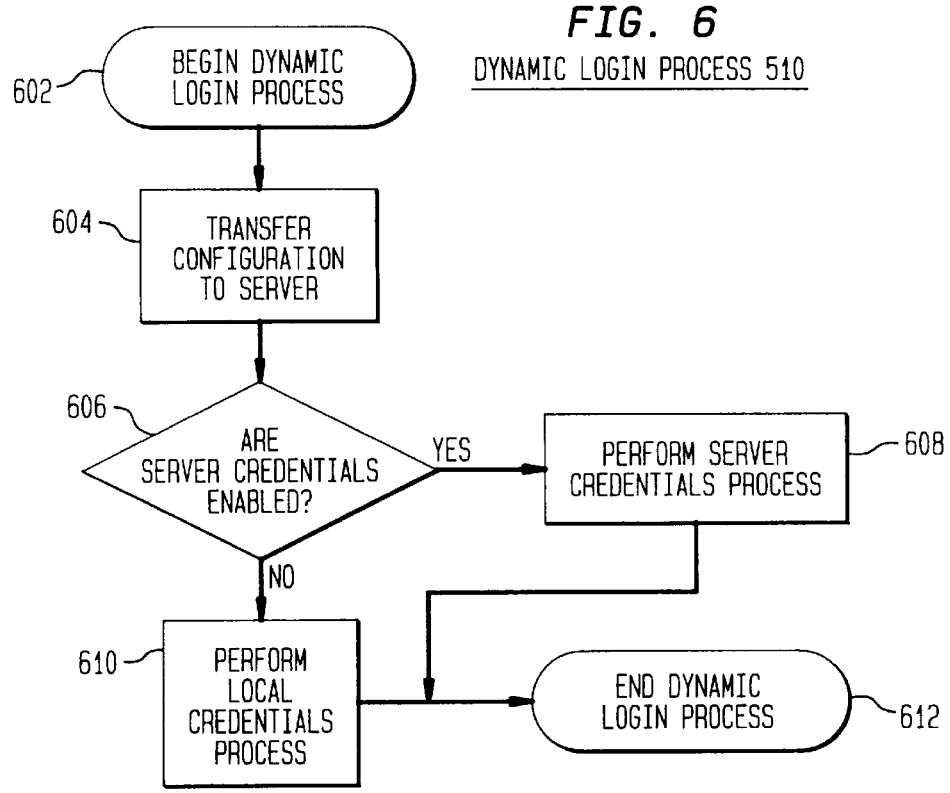
FIG. 6 is a flowchart exemplifying the operation of a dynamic login process.

FIG. 6 shows a dynamic login process according to an embodiment of the invention. A dynamic login process is a type of login process that may create a user account as needed on client 102A. At block 602, the dynamic login process 510 begins. At block 604, workstation configuration information contained in workstation object 305G is transferred to the client 102A at block 604 and stored in login settings 346 and, on a Windows NT client, in the Windows registry. If, at block 606, process 209 determines that server credentials are enabled, that is, the server credentials flag 318 is set, then the authentication process 209 performs a process associated with server credentials at block 608. If server credentials are not enabled, the authentication process 209 performs a process associated with local credentials at block 610. At block 612, the dynamic login process 510 ends.

Figure 7:
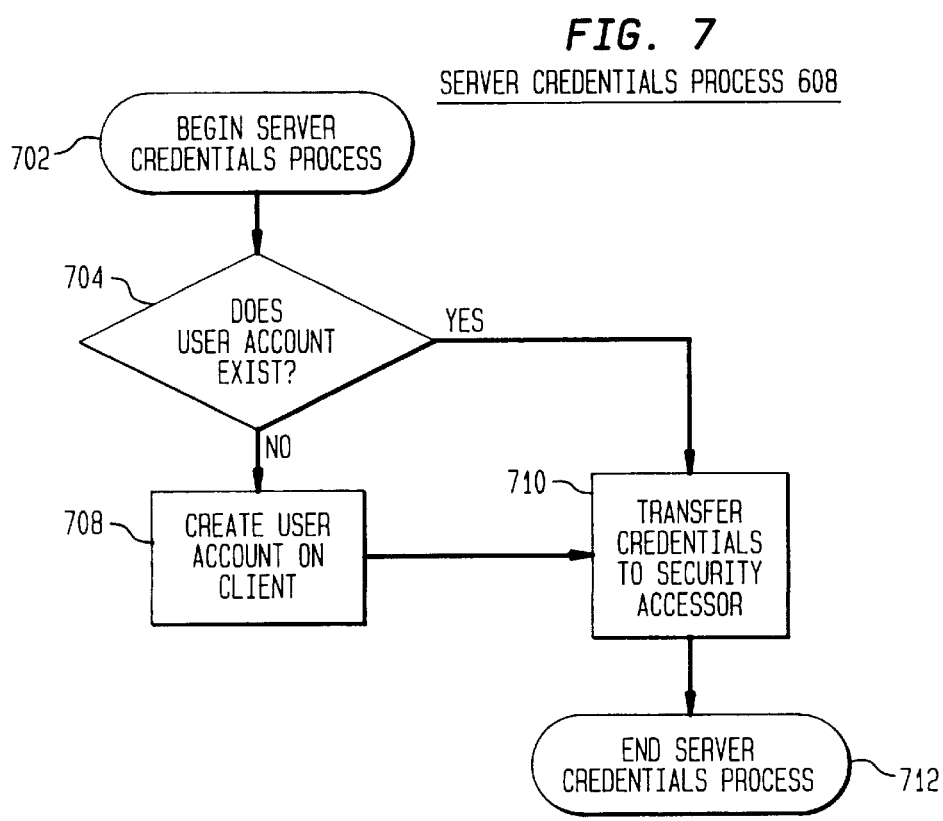
FIG. 7 is a flowchart exemplifying the operation of a server credentials process.

A process associated with server credentials is shown in FIG. 7. At block 702, the creation process 608 begins. At block 704, process 209 determines whether the user account associated with the credential information provided by the user exists in the local access database 203. If the account exists, the local credentials 216 are simply transferred to the security accessor 202. In a preferred embodiment, process 209 synchronizes the password in the local access database 203 with the password from the directory services database 223. That is, process 209 sets the value of the password in the local access database 203 to the value of the password in the directory services database having a username corresponding to the client user account. If the user account does not exist, the authentication process 209, which executes as an administrator user, creates a user account on the client 102A at block 708. As discussed above, the administrator account allows a user or process logged in as the administrator to create, modify, or delete accounts in the local access database 203. Process 209 may use the directory services user name as the user name for the client account. Similarly, process 209 may use the password associated with the directory services user name. When the account is created, the credentials for accessing the account are transferred to the security accessor 202 at block 710. At block 712, the server credentials process 608 ends.

Figure 8:
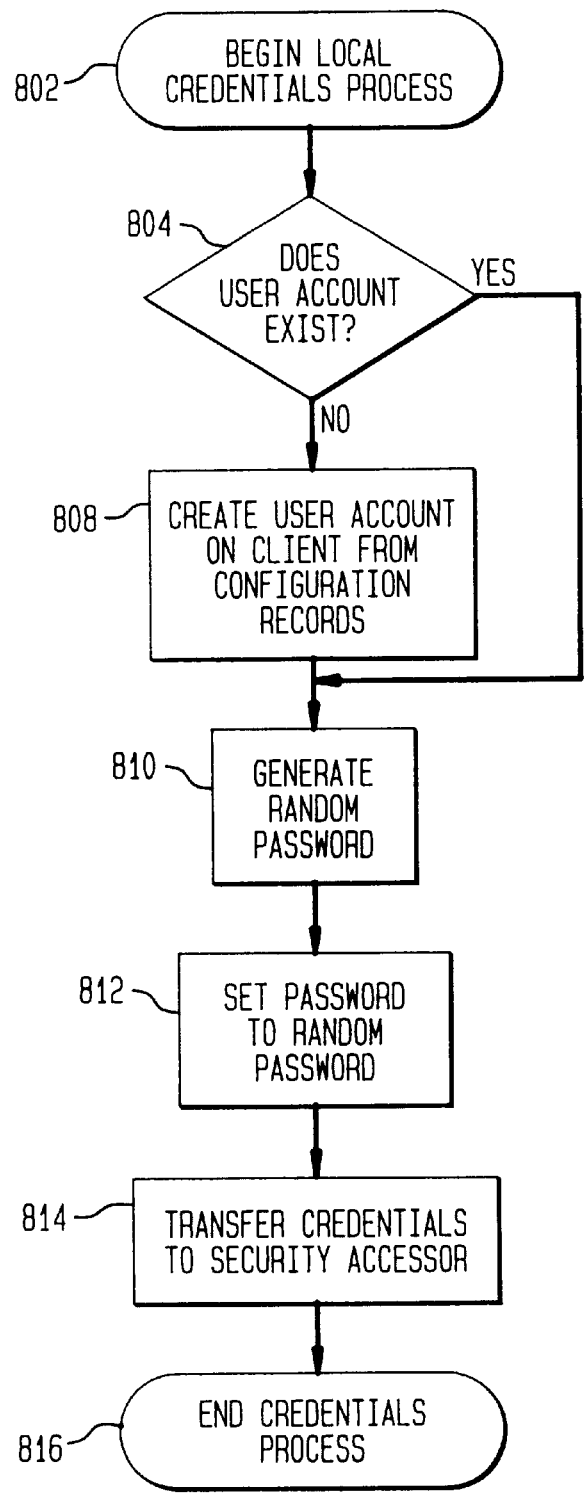
FIG. 8 is a flowchart exemplifying the operation of a local credentials process.

In FIG. 8, the process associated with local credentials is shown. At block 802, the process for creating a user account on the client 102A begins. If, at block 804, process 209 determines that a user account corresponding to credential information entered by the user at the client 102A exists, then the local credential information 216 is transferred to the security accessor 202. If the user account does not exist, the authentication process 209 creates a user account in the local access database 203 according to configuration records contained in the workstation object 305G at block 808. At block 810, process 209 generates a random password associated with the user name 319 of the client workstation object 305G. The password in the local access database 203 is set to the value of the generated random password at block 812. At block 814, process 209 transfers credential information to the security accessor 202. At block 816, the local credentials process 610 ends.

Figure 9:
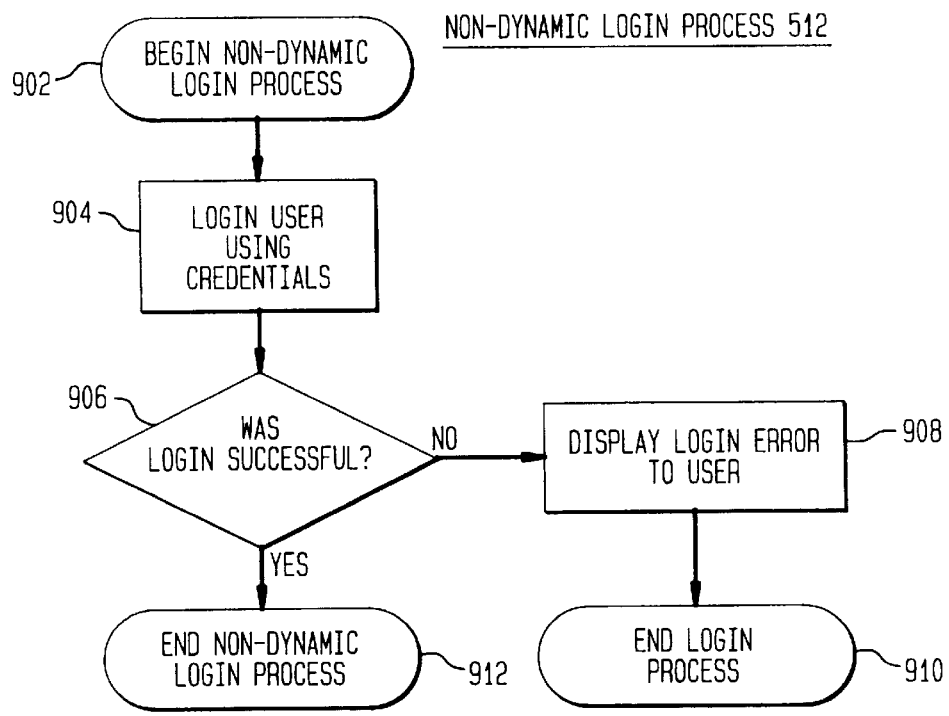
FIG. 9 is a flowchart exemplifying the operation of a non-dynamic login process.

FIG. 9 shows a non-dynamic login process 512 according to an embodiment of the present invention. At block 902, the non-dynamic login process begins. If, at block 904, process 209 attempts to login the user using the information defined by the user in local credentials 216, that is, using the directory services username 345 and password 346 or alternate username 350 and password 351, if provided. If the login attempt is successful, the non-dynamic login process ends at block 908. If the login attempt fails, a login error is displayed to the user and the login process ends at block 910. As an alternative, the user may be provided additional chances to enter a proper username and password, as needed.

A user object inspection process 506 according to an embodiment of the present invention is shown in FIG. 10. At block 1002, the user object inspection process 605 begins. At block 104, the process 209 locates the client configuration by accessing objects in the directory services database 223. Beginning with the user object 305D, process 209 searches for an association to a client workstation object 305G. As described above, such an association is represented by the client workstation configuration pointer 312. If the value of pointer 312 is null, process 209 enumerates all of the groups to which the user object 305D belongs and checks the group objects for a client workstation configuration pointer 312 which points to a client workstation objection 305G. The first workstation object found by process 209 is used for configuration of client 102A. If, at block 1006, the user object 305D is associated with a client workstation objection 305G, the configuration information is read from the client workstation object 305G and transferred to the client 102A. If not, process 209 inspects the groups to which the user object 305D is a member at block 1010. If, at block 1012, a group object is located that is associated with a workstation object 305G, the configuration of the client workstation object 305G is transferred to the client 102A and stored on the client 102A as described above. If not, process 209 will inspect the parent container object at block 1016. If, at block 1018, the parent container object is associated with a workstation objection, the configuration associated with the client workstation object 305G is transferred to the client 102A. If not, a default configuration is used to create the local user account at block 1022. At block 1024, the user object inspection process 506 ends.

Figure 11:
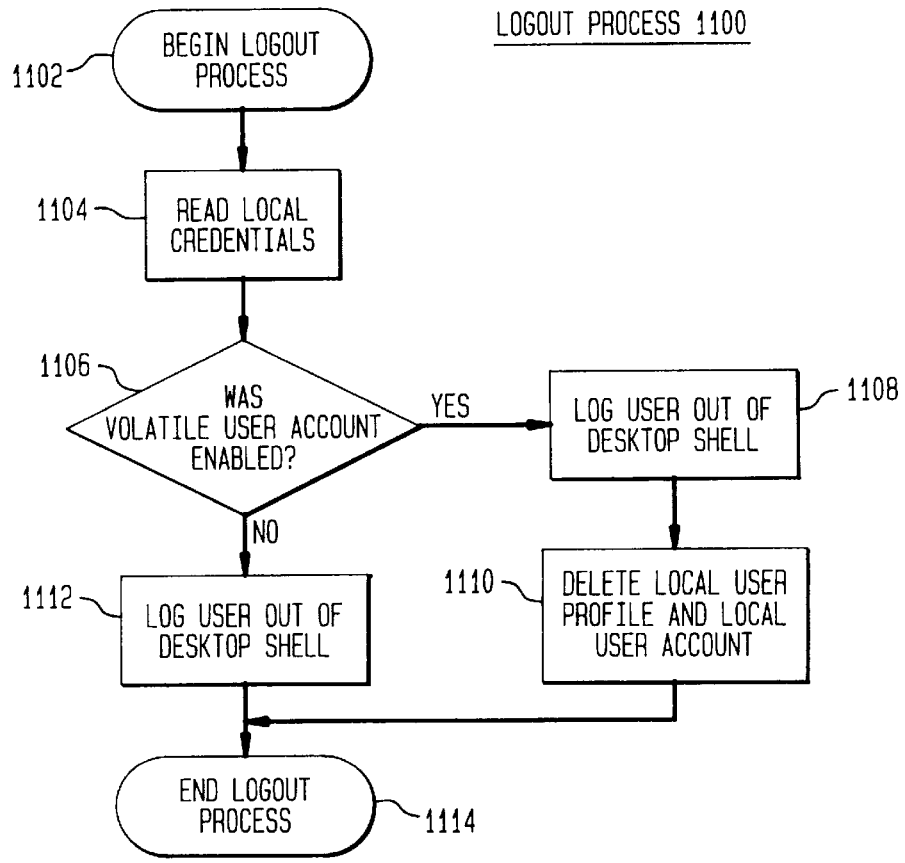
FIG. 11 is a flowchart exemplifying the operation of a logout process.

In FIG. 11, an exemplary logout process 1100 is shown. At block 1102, the logout process 1100 begins. At block 1104, the authentication process 209 reads information in local credentials 216. Specifically, process 209 inspects the value of the dynamic login flag 317 as downloaded to login settings 346 during login. If, at block 1106, process 209 determines that the user account currently being used was created as a volatile user account, then process 209 logs the user out of the desktop shell and deletes the local user profile from the registry and the user account from the local access database 203. If process 209 determines that the user account was not volatile, process 209 logs the user out of the desktop shell at block 1112. At block 1112, process 1100 ends.

It should be understood, however, that embodiments of the invention may be directed to other types of clients, servers, and operating systems. Such embodiments may include a Windows NT client authenticating to a server executing the UNIX operating system, wherein the UNIX operating system maintains an authentication database such as the Network Information Service (NIS). Various embodiments of this type would be apparent to one skilled in the art of computer programming.

Further, it should also be understood that the foregoing description has been directed to specific embodiments of this invention. It will be apparent, however, that other variations and modifications may be made to the described embodiments, to attain some or all of their advantages. Therefore, it is the object of the appended claims to cover all such variations and modifications to come within the true spirit and scope of the invention.

What is claimed is:

1. A method for managing user accounts in a communications network having a client and server, the method comprising the steps of:
   a) logging in a user to the server having a database, the database having a first set of credential information wherein the database is a hierarchical directory services database having a user object that includes the first set of credential information;
   b) logging in the user to the client account using the first set of credential information;
   c) accessing a workstation object having associated configuration information; and
   d) based on the configuration information, generating an account on the client.

2. The method according to claim 1, wherein step d) includes the steps of:
   1) starting a timer when the client account is generated; and
   2) deleting the client account when the timer exceeds a predetermined time.

3. The method of claim 1, wherein step a) includes the steps of:
   1) transferring entered credentials to the server;
   2) inspecting a workstation object having login parameters;
   3) logging in the user based upon the login parameters; and
   4) updating client credentials based upon the login parameters.

4. A system for providing a user authentication to a client workstation having a security accessor, the system comprising:
   a login process being operable to automatically create a user account on the client workstation; and
   a directory services authenticator providing credentials to the login process, wherein the login process authenticates a user to the security accessor using the credentials.

5. A client-server system for managing user accounts in a distributed network, the system comprising:
   a directory services database having a plurality of network objects; and
   a client administrator associated with the directory services database, configured to create a plurality of client objects in the directory services database, wherein each of said plurality of client objects represents a client system.

6. The client-server system according to claim 5, further including means for associating one of the plurality of client objects to at least one of the plurality of network objects.

7. The client-server system according to claim 6, wherein the at least one of the plurality of network objects is a user object representing a user.

8. The client-server system according to claim 7, wherein at least one of said plurality of client objects includes login information associated with the user object.

9. The client-server system according to claim 5, wherein each of said plurality of client objects includes login information.

10. A method for managing user accounts in a communications network having a client and a server, the method comprising the steps of:

a) logging in a user to a first server having a distributed database, the distributed database having a first set of credential information including a username and a password;

b) locating a user account on the client, the user account having a same username as the first set of credential information; and c) synchronizing a password of the user account with the password of the first set of credential information.

11. The method according to claim 10, wherein step a) includes the steps of:

1) transferring entered credentials to the server;

2) inspecting a workstation object having login parameters;

3) logging in the user based upon the login parameters; and 4) updating client credentials based upon the login parameters.

12. A method for managing user accounts in a communications network having a client and a server, the method comprising steps of:

a) logging in a user to a server having a directory services database;

b) logging in the user at a client, wherein credentials for logging in the user to the server and client are synchronized.

13. The method according to claim 12, further comprising automatically creating an account at the client if no previous account exists.

14. The method according to claim 13, further comprising automatically deleting the account after a predetermined amount of time.

15. The method according to claim 14, wherein the predetermined amount of time is measured from an end of a last login period of the user.

* * * * *